Sept. 6, 1949.  J. H. LINK  2,481,030
FRICTION SHOCK ABSORBER
Filed April 5, 1944
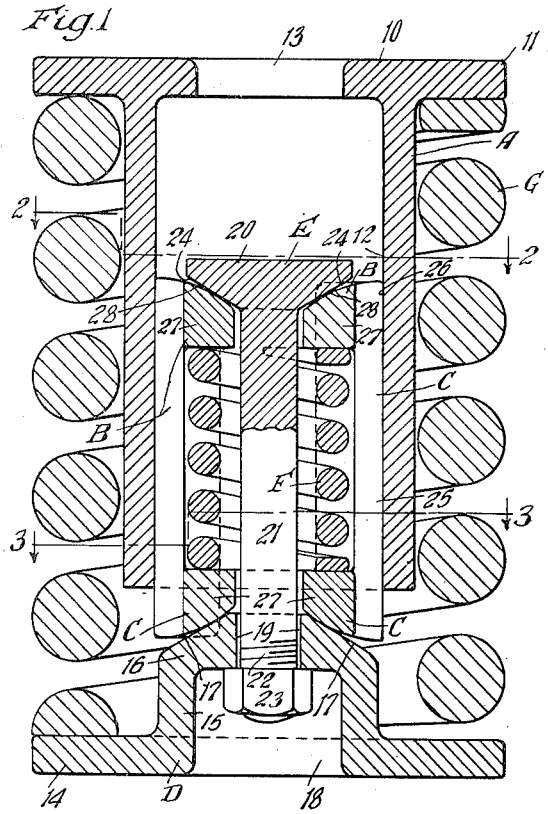
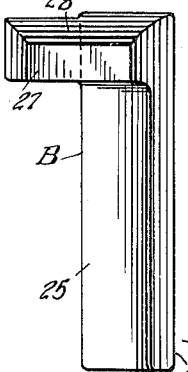
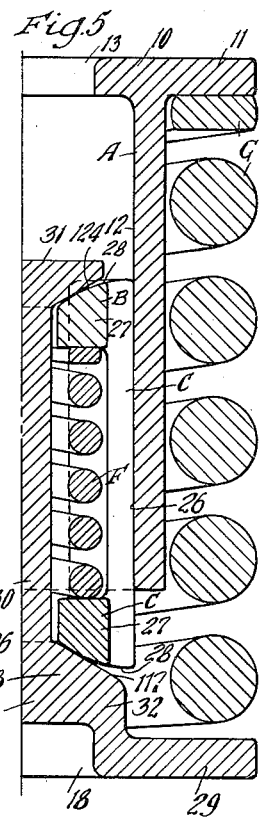
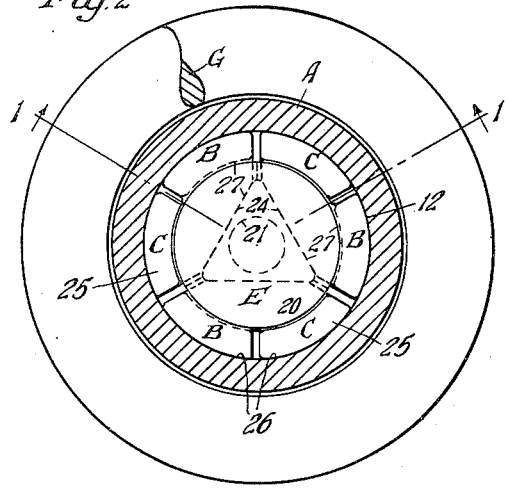
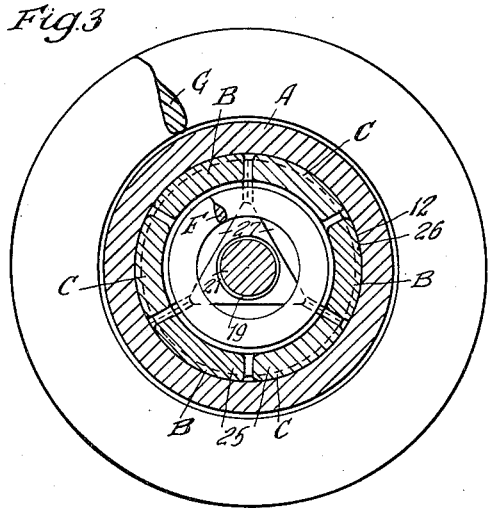
Inventor
John H. Link
By Henry Fuchs
Atty.

Patented Sept. 6, 1949

2,481,030

UNITED STATES PATENT OFFICE 2,481,030

FRICTION SHOCK ABSORBER

John H. Link, Merion, Pa., assignor to W. H. Miner, Inc., Chicago, Ill., a corporation of Delaware Application April 5, 1944, Serial No. 529,557

15 Claims. (Cl. 267—9)

This invention relates to improvements in friction shock absorbers, especially adapted for use with truck springs of railway cars for dampening or snubbing the action of the springs.

One object of the invention is to provide a friction shock absorber for snubbing the action of railway car truck springs, comprising a friction casing and friction shoes having sliding engagement with the interior walls of the casing, wherein the friction shoes are pressed against said casing walls by spring actuated wedge means exerting substantially constant pressure throughout the compression stroke of the mechanism, whereby the snubbing action is uniform during the operation of the device.

A further object of the invention is to provide a friction shock absorber as set forth in the preceding paragraph, wherein the spring actuated wedge means comprises relatively fixed wedge members at opposite ends of the shoes having wedge faces engaging wedge faces on the shoes, and a spring under constant compression forcing the shoes against the wedge members.

Another object of the invention is to provide a mechanism, as hereinbefore specified, wherein the shoes comprise an annular series composed of two sets, the shoes of one set being alternated with the shoes of the other set, and each shoe of each set having a head at one end thereof in wedging engagement with one of said relatively fixed wedge members, the respective shoes of said two sets being reversely arranged end for end and having the heads of one set laterally overlapping the corresponding ends of the shoes of the other set, whereby the spreading action produced by wedging engagement of the heads with the wedge members is applied at opposite ends of each shoe, thus equally distributing the pressure throughout the entire length of the friction area of each shoe.

Other objects of the invention will more clearly appear from the description and claims hereinafter following.

In the drawing forming a part of this specification, Figure 1 is a vertical sectional view on two intersecting vertical planes at an angle of 120 degrees to each other, corresponding substantially to the line 1—1 of Figure 2. Figures 2 and 3 are horizontal sectional views, corresponding respectively to the lines 2—2 and 3—3 of Figure 1. Figure 4 is an inside elevational view of one of the friction shoes of my improved shock absorber. Figure 5 is a view, similar to Figure 1, showing the right hand side half of my improved mechanism, illustrating another embodiment of the invention.

Referring first to the embodiment of the invention illustrated in Figures 1, 2, 3, and 4, my improved shock absorber comprises broadly a friction casing A; a set of friction shoes B—B—B; a second set of friction shoes C—C—C alternated with the shoes B—B—B; a combined follower and wedge D; a wedge member E; an inner spring F; and an outer spring G.

The casing A is in the form of a cylindrical, tubular member having a horizontal top wall 10, which is extended laterally outwardly of the casing to provide a circular flange 11 forming, in effect, a follower member integral with the casing. The casing A is open at the bottom and is provided with an interior, cylindrical friction surface 12, which extends lengthwise thereof. The top wall 10 of the casing has a central opening 13 therethrough adapted to receive the usual spring centering projection of the upper spring follower plate of the spring cluster of a railway car truck.

The combined follower and wedge D, which is located at the lower end of the mechanism, comprises a disclike plate 14 having a central, upstanding, hollow boss 15 formed integral therewith. The transverse upper end wall of the boss 15 is thickened, as shown, to provide a projection or wedge portion proper 16 of said combined follower and wedge member. The wedge projection 16 has three wedge faces 17 which are arranged symmetrically about the central axis of the mechanism and converge inwardly and upwardly.

The opening of the hollow boss 15, which opening is indicated by 18, provides a socket or seat, adapted to accommodate the spring centering projection of the lower spring follower plate of the spring cluster of the railway truck. The wedge projection 16 is provided with a central bore or opening 19, for a purpose hereinafter described.

The wedge E comprises a head 20 having a depending stem or shank 21 of circular cross section. The lower end of the stem or shank 21 is threaded, as indicated at 22, and a securing nut 23 is mounted on said threaded end to anchor the wedge member E to the combined follower and wedge D. The head 20 of the wedge E is provided with three wedge faces 24—24—24 arranged symmetrically about the axis of the mechanism and converging downwardly and inwardly toward said axis.

The friction shoes are six in number and, together with the combined follower and wedge D, wedge member E, and spring F, form a friction clutch which is telescoped within the casing A. The six shoes are arranged in annular series, comprising a set of three shoes B—B—B and a set of three shoes C—C—C, the shoes of the two sets being alternated. The shoes B and C are all of similar design, but reversely arranged end for end, as hereinafter pointed out.

Each shoe comprises a relatively heavy, transversely curved, section 25 presenting a longitudinally extending, transversely curved friction surface 26 on the outer side thereof. The assembled shoes B—B—B and C—C—C form, in effect, a sectional cylinder which is vertically split into six similar parts or sections.

Each shoe B has a laterally projecting, inward enlargement at the upper end thereof in the form of a heavy flange 27. The flange 27 is of greater width than the section 25 of the shoe and projects from one side of said section, as most clearly shown in Figure 4. The peripheral edge of the projecting portion of the flange 27 is curved so as to fit the interior wall of the plate section 25 of the adjacent shoe. On the inner side thereof the enlargement of flange 27 of the shoe B is provided with an upwardly facing wedge face 28 adapted to engage the corresponding wedge face 24 of the wedge E.

As hereinbefore pointed out, the shoes B and C are reversely arranged, but of the same design, the shoes C are thus duplicates of the shoes B, each shoe C having a laterally projecting, inward enlargement at the lower end thereof corresponding to the enlargement 27 of the shoe B, and also indicated by 27. The enlargement 27 of the shoe C is provided with a downwardly facing wedge face, similar to the wedge face 28 of the shoe B, and is also indicated by 28. The wedge face 28 of each shoe C engages the corresponding wedge face 17 of the combined follower and wedge D.

As hereinbefore stated, the shoes B—B—B and C—C—C are alternated, the shoes C—C—C being reversely arranged end for end with respect to the shoes B—B—B. The shoes B—B—B thus have the wedge portions thereof at the upper end and the shoes C—C—C have the wedge portions at their lower ends, with the laterally projecting portions of the flanges 27—27—27 of the shoes B—B—B laterally overlapping the width of the upper end portions of the plate sections 25—25—25 of the shoes C—C—C, and the laterally projecting portions of the flanges 27—27—27 of the shoes C—C—C laterally overlapping the width of the lower end portions of the plate sections 25—25—25 of the shoes B—B—B. The peripheral edges of the overlapping portions of the flanges 27—27—27 directly bear on the overlapped plate sections of the adjacent shoes, whereby said overlapped shoes are forced laterally outwardly as the flanges are wedged outwardly. Inasmuch as direct wedging action is provided at one end of each shoe and the other end of the same shoe is forced outwardly by the wedge projection on the adjacent shoe, the spreading action is distributed so that the pressure is equalized along the entire length of the friction area of the shoe.

The wedge faces 28 of the shoes B and C are preferably rounded or crowned, as shown in Figure 1, to render the device flexible to compensate for possible relative tilting of the parts in service, that is, tilting of the friction casing A with respect to the combined follower and wedge D.

The inner spring F, which is in the form of a coil, is embraced between the shoes B—B—B and C—C—C and has its top and bottom ends bearing respectively on the inner sides of the flanges 27—27 at the top and bottom ends of the shoes B and C.

The spring F is under predetermined compression and forces the shoes apart by wedging engagement of the shoes with the combined follower and wedge D and the wedge E.

The outer spring G is in the form of a relatively heavy coil, which surrounds the friction casing A and has its top and bottom ends bearing respectively on the follower flange 11 of the casing A and the disclike plate 14 of the combined follower and wedge D.

My improved shock absorber is substituted for one or more of the coil spring units of a cluster of truck springs, the same being interposed between the top and bottom spring follower plates of said cluster.

The operation of the improved shock absorber illustrated in Figures 1 to 4 inclusive is as follows: Upon the spring cluster of the truck being compressed between the spring follower plates of said cluster, the clutch comprising the shoes B—B—B and C—C—C, and the friction casing A are moved in lengthwise direction toward each other, thereby compressing the spring G and sliding the clutch inwardly along the friction surfaces of the casing A, thus producing the required amount of frictional resistance to snub or dampen the action of the coils of the truck spring cluster.

As will be evident, the frictional resistance provided is substantially constant, inasmuch as the spring F which wedges the shoes apart is under a predetermined compression which remains constant throughout the operation of the shock absorber.

During recoil of the truck springs, expansion of the spring G returns all of the parts to the normal position shown in Figure 1.

As will be evident, the frictional resistance provided between the shoes and the casing being constant during all phases of the operation of my improved friction shock absorber, the same amount of frictional resistance to snub the action of the truck springs is provided during both compression and recoil of the truck springs.

Referring next to the embodiment of the invention illustrated in Figure 5, the construction is similar to that shown in Figures 1 to 4 inclusive, with the exception that the upper wedge member is formed integral and rigid with the combined follower and wedge member.

My improved shock absorber as illustrated in Figure 5 comprises broadly a friction casing in all respects identical with the friction casing A hereinbefore described, and also indicated by A; three friction shoes similar to the shoes B and also indicated by B; three friction shoes similar to the shoes C, also indicated by C; inner and outer springs similar to the springs F and G, also indicated by F and G; and a combined follower and wedge member H.

The casing A, the shoes B and C, and the springs F and G, shown in Figure 5, being in all respects similar to the casing A, shoes B and C, and the springs F and G hereinbefore described, the parts thereof are indicated by the same reference characters as employed in Figures 1 to 4, inclusive.

The combined follower and wedge member H comprises a substantially flat disc 29 having an upstanding, cylindrical post 30 thereon which is provided with a head 31 at its upper end. The post 30 extends from a central, hollow boss 32 formed on the disc 29. The post 30 is enlarged at its lower end, as indicated at 33, to provide a wedge portion.

The head 31 of the post has three wedge faces 124—124—124 identical with the wedge faces 24—24—24 hereinbefore described in connection with the wedge E. The enlargement 33 at the lower end of the post 30 also has three wedge faces, which are indicated by 117—117—117 and which are identical with the wedge faces 17—17—17 of the combined follower and wedge D hereinbefore described. The wedge faces 28 at the top and bottom ends of the shoes B and C, respectively engage the wedge faces 124 and 117 of the head 31 and the wedge portion 33 of the post 30 to spread the shoes apart through the action of the spring F.

The operation of my improved shock absorber shown in Figure 5 is identical with the operation of the shock absorber described in connection with Figures 1 to 4 inclusive, and therefore needs no further detailed description.

I claim:

1. In a friction shock absorber, the combination with a friction casing; of a friction unit comprising a plurality of friction shoes slidingly telescoped within said casing; wedge means at opposite ends of said unit, the wedge means at one end of said unit having wedging engagement only with the corresponding ends of certain of said shoes and the wedge means at the other end of said unit having wedging engagement only with the corresponding ends of the remaining shoes; spring means bearing on said shoes for forcing the same against said wedge means to spread said shoes apart; and spring means yieldingly opposing relative lengthwise movement of said casing and shoes toward each other.

2. In a friction shock absorber, the combination with a friction casing; of a friction unit comprising a plurality of friction shoes slidingly telescoped within said casing; wedge means at opposite ends of said unit, the wedge means at one end of said unit having wedging engagement only with the corresponding ends of certain of said shoes and the wedge means at the other end of said unit having wedging engagement only with the corresponding ends of the remaining shoes; a spring under constant uniform compression bearing on said shoes for forcing the same against said wedge means to spread said shoes apart; and spring means yieldingly opposing relative lengthwise movement of said casing and shoes toward each other.

3. In a friction shock absorber, the combination with a friction casing; of a plurality of friction shoes slidingly telescoped within said casing; wedge members at opposite ends of said shoes, said wedge members being held against separation lengthwise of the mechanism, one of said wedge members having wedging engagement only with certain of said shoes and the other of said wedge members having wedging engagement only with the remaining shoes; spring means bearing on said shoes for forcing the same against said wedge members to spread said shoes apart; and spring means yieldingly opposing relative lengthwise movement of said casing and shoes toward each other.

4. In a friction shock absorber, the combination with a friction casing; of a follower movable lengthwise of the mechanism toward and away from said casing; a plurality of friction shoes slidingly telescoped within said casing; wedge members at opposite ends of said shoes, said wedge members being connected to said follower for movement in unison therewith, and having wedging engagement at opposite ends with said shoes; a spring under constant uniform compression bearing on said shoes for forcing the same against said wedge members to spread said shoes apart; and spring means for yieldingly opposing relative lengthwise movement of said casing and follower toward each other.

5. In a friction shock absorber, the combination with a friction casing; of a plurality of friction shoes arranged in annular series, slidingly telescoped within said casing; a follower having wedge means thereon in wedging engagement with certain of said shoes, said follower being movable toward and away from the casing; a wedge in wedging engagement with the remaining shoes, said wedge being anchored to the follower for movement therewith; a spring bearing on said shoes for forcing said shoes against said wedge means and wedge; and spring means yieldingly opposing relative approach of said follower and casing.

6. In a friction shock absorber, the combination with a friction casing; of a plurality of friction shoes arranged in annular series, slidingly telescoped within said casing; a follower movable toward and away from said casing lengthwise of the mechanism; wedge members at opposite ends of said shoes connected to said follower for movement in unison therewith, one of said wedge members having wedging engagement with certain of said shoes only, and the other wedge member having wedging engagement with the remaining shoes only; spring means enclosed by said series of shoes forcing the same against said wedge members; and spring means yieldingly opposing relative movement of said follower and casing toward each other.

7. In a friction shock absorber, the combination with a friction casing; of a follower movable toward and away from said casing; inner and outer wedge members movable in unison with said follower; a series of friction shoes slidingly telescoped within said casing between said inner and outer wedge members, certain of said shoes having wedge faces thereon in wedging engagement with one of said wedge members only, the remaining shoes having wedge faces thereon in wedging engagement with the other of said wedge members only; a spring forcing said shoes against the wedge members; and spring means opposing relative lengthwise movement of said follower and casing toward each other.

8. In a friction shock absorber, the combination with a friction casing; of an annular series of friction shoes slidingly telescoped within the casing, said annular series comprising two sets of shoes, the shoes of one set being alternated with the shoes of the other set; lateral projections on the shoes of one set at the inner ends thereof provided with wedge faces; lateral projections on the shoes of the other set at the outer ends thereof provided with wedge faces; a spring under lengthwise compression embraced by said series of shoes and bearing at opposite ends on said projections; wedge members at the inner and outer ends of said shoes held against separation lengthwise of the mechanism and having wedging engagement with the wedge faces of said projections of said shoes; and spring means yieldingly opposing relative lengthwise movement of the wedge members and casing toward each other.

9. In a friction shock absorber, the combination with a friction casing; of a follower, said follower and casing being relatively movable lengthwise of the mechanism; inner and outer wedge members movable in unison with said follower; an annular series of friction shoes interposed between said inner and outer wedge members and slidingly telescoped within the casing, said series including two sets of shoes, the shoes of one set being alternated with the shoes of the other set, the shoes of one set having wedge projections at the inner ends thereof in wedging engagement with said inner wedge member, and the shoes of the other set having wedge projections at the outer ends thereof in wedging engagement with said outer wedge member; a lengthwise disposed spring interposed between said shoes and bearing at opposite ends on the wedge projections at the inner and outer ends of said shoes; and a spring yieldingly opposing relative lengthwise movement of said follower and casing toward each other.

10. In a friction shock absorber, the combination with a friction casing; of a follower, said follower and casing being relatively movable lengthwise of the mechanism; inner and outer wedge members movable in unison with said follower, said wedge members being held against relative lengthwise separation; an annular series of friction shoes slidingly telescoped within the casing, said shoes being interposed between said inner and outer wedge members, said annular series including two sets of shoes, the shoes of one set being alternated with the shoes of the other set; laterally projecting flanges on the inner ends of the shoes of one of said sets; laterally projecting flanges on the outer ends of the shoes of the other set; wedge faces on the flanges of the respective sets of shoes in wedging engagement with said inner and outer wedge members; a spring under lengthwise compression having its opposite ends bearing on the flanges at the inner and outer ends of said shoes; and a second spring opposing relative movement of said follower and casing toward each other.

11. In a friction shock absorber, the combination with a friction casing; of inner and outer wedge members held against separation lengthwise of the mechanism with respect to each other; an annular series of friction shoes slidingly telescoped within the casing, said series of shoes including two sets, the shoes of one set being alternated with the shoes of the other set; laterally projecting flanges on the inner ends of the shoes of one of said sets, laterally overlapping the inner ends of the shoes of the other set and bearing on the inner sides of said shoes; laterally projecting flanges on the outer ends of the shoes of the other set, laterally overlapping the outer ends of the shoes of said set having flanges at the inner ends, and bearing on the inner sides thereof; wedge means on the flanges which are at the inner and outer ends of said shoes, said wedge means having wedging engagement with the inner and outer wedge members; a spring under compression bearing at opposite ends on said flanges of said shoes to force the latter against the wedge members and spread the shoes apart; and a spring opposing lengthwise movement of the shoes inwardly of the casing.

12. In a friction shock absorber, the combination with a casing; of a friction clutch lengthwise slidable within the casing, said clutch including an annular series of lengthwise disposed friction shoes, said shoes comprising a set having laterally inwardly projecting flanges at their inner ends, and a set having laterally projecting flanges at their outer ends, the shoes of said two sets being alternated, said lateral flanges of each set overlapping the corresponding ends of the shoes of the other set at the inner sides of said ends and bearing thereon; wedge means having wedging engagement with the flanges of said shoes to spread said shoes apart and resilient means for forcing said shoes against said spreading means; and means yieldingly resisting movement of said shoes inwardly of the casing.

13. In a friction shock absorber, the combination with a casing; of a friction clutch lengthwise slidable within the casing, said clutch including an annular series of lengthwise disposed friction shoes, said shoes comprising a set having laterally inwardly projecting flanges at their inner ends, and a set having laterally projecting flanges at their outer ends, the shoes of said two sets being alternated, said lateral flanges of each set overlapping the corresponding ends of the shoes of the other set at the inner sides of said ends and bearing thereon; spreading means for spreading said shoes including wedge means cooperating with the flanges of said shoes; and means yieldingly resisting movement of said shoes inwardly of the casing.

14. In a friction shock absorber, the combination with a friction casing; of a follower movable toward and away from said casing; inner and outer wedge members movable in unison with said follower; a series of friction shoes slidingly telescoped within said casing between said inner and outer wedge members, certain of said shoes having rounded wedge faces thereon in wedging engagement with one of said wedge members, the remaining shoes having rounded wedge faces thereon in wedging engagement with the other of said wedge members; a spring bearing on said shoes for forcing the same against the wedge members; and spring means opposing relative lengthwise movement of said follower and casing toward each other.

15. In a friction shock absorber, the combination with a friction casing; of a follower, said follower and casing being relatively movable lengthwise of the mechanism; inner and outer wedge members movable in unison with said follower, said wedge members being held against relative lengthwise separation; an annular series of friction shoes slidingly telescoped within the casing, said shoes being interposed between said inner and outer wedge members, said annular series including two sets of shoes, the shoes of one set being alternated with the shoes of the other set; laterally projecting flanges on the inner ends of the shoes of one of said sets; laterally projecting flanges on the outer ends of the shoes of the other set; rounded wedge faces on the flanges of the respective sets of shoes in wedging engagement with said inner and outer wedge members; a spring under lengthwise compression having its opposite ends bearing on the flanges at the inner and outer ends of said shoes; and a second spring opposing relative movement of said follower and casing toward each other.

JOHN H. LINK.

REFERENCES CITED

The following references are of record in the file of this patent:

UNITED STATES PATENTS

| Number | Name | Date |
| --- | --- | --- |
| 869,269 | Simpson | Oct. 29, 1907 |
| 1,127,657 | McCormick | Feb. 9, 1915 |
| 1,256,297 | Courson | Feb. 12, 1918 |
| 1,730,500 | Geiger | Oct. 8, 1929 |
| 1,985,369 | Fuchs | Dec. 25, 1934 |
| 2,242,413 | Blattner | May 20, 1941 |
| 2,276,228 | Cottrell | Mar. 10, 1942 |